United States Patent
Baumann et al.

(10) Patent No.: US 7,404,512 B2
(45) Date of Patent: Jul. 29, 2008

(54) CLAMPING APPARATUS AND METHODS FOR MANUFACTURING

(75) Inventors: John A. Baumann, St. Charles, MO (US); Richard J. Lederich, Des Peres, MO (US)

(73) Assignee: The Boeing Company, Chicago, IL (US)

( * ) Notice: Subject to any disclaimer, the term of this patent is extended or adjusted under 35 U.S.C. 154(b) by 314 days.

(21) Appl. No.: 10/698,592

(22) Filed: Oct. 31, 2003

(65) Prior Publication Data

US 2005/0092817 A1    May 5, 2005

(51) Int. Cl.
*B23K 37/04* (2006.01)
*B23K 20/12* (2006.01)

(52) U.S. Cl. ...................... 228/44.3; 228/2.1
(58) Field of Classification Search .................. None
See application file for complete search history.

(56) References Cited

U.S. PATENT DOCUMENTS

| | | | | |
|---|---|---|---|---|
| 2,187,227 | A * | 1/1940 | Flanders | 451/222 |
| 2,665,362 | A * | 1/1954 | Darner et al. | 219/60 R |
| 3,604,612 | A * | 9/1971 | Miller et al. | 228/45 |
| 4,304,512 | A * | 12/1981 | Vierstraete | 409/80 |
| 5,541,864 | A | 7/1996 | Van Bavel et al. | |
| 5,566,188 | A | 10/1996 | Robbins et al. | |
| 5,655,859 | A * | 8/1997 | Melzer et al. | 409/132 |
| 5,710,490 | A | 1/1998 | Choi | |
| 5,865,430 | A * | 2/1999 | Conover et al. | 269/43 |
| 5,971,247 | A * | 10/1999 | Gentry | 228/2.1 |
| 6,299,050 | B1 | 10/2001 | Okamura et al. | |
| 6,341,244 | B1 | 1/2002 | Papiermik | |
| 6,536,755 | B2 * | 3/2003 | Meron et al. | 269/91 |
| 6,774,598 | B1 | 8/2004 | Kohler et al. | |
| 6,832,879 | B2 * | 12/2004 | Wassmer | 409/197 |
| 2002/0162876 | A1 * | 11/2002 | Aota et al. | 228/112.1 |
| 2004/0048722 | A1 * | 3/2004 | Epstein | 482/54 |
| 2004/0120783 | A1 * | 6/2004 | Alber | 409/232 |
| 2004/0134971 | A1 * | 7/2004 | Narita et al. | 228/112.1 |
| 2006/0102689 | A1 * | 5/2006 | Trapp et al. | 228/2.1 |

FOREIGN PATENT DOCUMENTS

| | | |
|---|---|---|
| DE | 3404555 | 2/1984 |
| DE | 3304582 A1 * | 8/1984 |
| DE | 3404555 A * | 8/1985 |
| EP | 0010043 | 9/1981 |

* cited by examiner

*Primary Examiner*—Kiley Stoner
(74) *Attorney, Agent, or Firm*—Lee & Hayes, PLLC

(57) ABSTRACT

An apparatus and methods for clamping around a manufacturing tool engaging a work piece are described. In one embodiment, a clamp includes a moveable support arranged to at least partially surround a circumference defining a work area. A friction reducing element is attached to the support to apply pressure to the surface when the clamp is engaged with the work piece, and to allow the clamp to be moved with the manufacturing tool. In accordance with other aspects of the invention, the clamp co-annularly or partially surrounds the manufacturing tool. In another embodiment, the manufacturing tool is a friction stir welding tool.

22 Claims, 10 Drawing Sheets

CLAMPING APPARATUS AND METHODS FOR MANUFACTURING

FIELD OF THE INVENTION

This invention relates generally to clamping and, more specifically, to clamping during manufacturing operations.

BACKGROUND OF THE INVENTION

During manufacturing work such as machining, routing, cutting, and welding, the work pieces are often held by clamps when a manufacturing tool engages the work piece. Typically such clamps are placed independently from the manufacturing tool. Such clamps include bar clamps, c-clamps, vises, and similar clamping tools. In manufacturing operations where a tool engages the work piece with substantial force, clamping near where the manufacturing tool engages the work piece may not be sufficient to hold the work piece in position. There may be a distance between the manufacturing tool and the applied clamp or clamps. Further, clamping may not be engaged in most or all areas surrounding the tool as the tool engages the work piece.

In friction stir welding, a process that plastically bonds metals, plunging the friction stir welding tool into a weld line of a work piece, and moving the tool along the weld line can push the parts of the work piece being welded away from the underlying structure, or away from each other.

Accordingly, there is an unmet need in the art for clamping systems that can engage a work piece close to a manufacturing tool.

SUMMARY OF THE INVENTION

The present invention is directed to an apparatus and methods for clamping around a manufacturing tool engaging a work piece. In one embodiment, a clamp includes a moveable support arranged to at least partially surround a circumference defining a work area. A friction reducing element is attached to the support to apply pressure to the surface when the clamp is engaged with the work piece, and to allow the clamp to be moved with the manufacturing tool. In accordance with other aspects of the invention, the clamp co-annularly surrounds the manufacturing tool. In another embodiment the manufacturing tool is a friction stir welding tool.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to apparatus and methods for a clamping device. Many specific details of certain embodiments of the invention are set forth in the following description and in FIGS. 1-10 to provide a thorough understanding of such embodiments. One skilled in the art, however, will understand that the present invention may have additional embodiments, or that the present invention may be practiced without several of the details described in the following description.

Figure 1A:
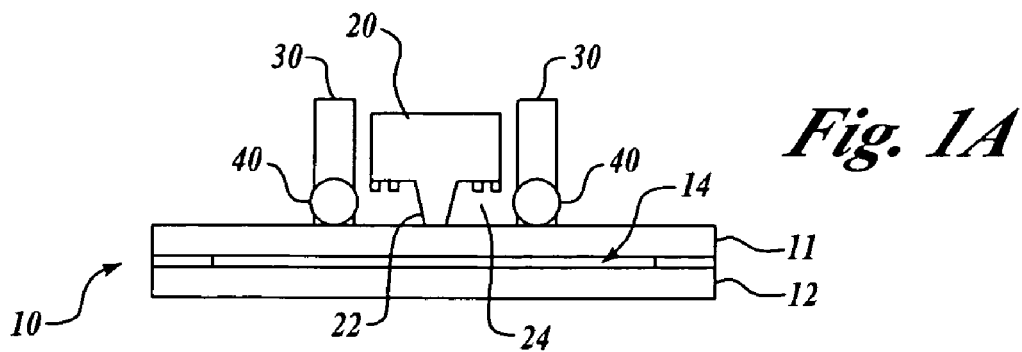
FIG. 1A is a cross-section of an exemplary clamp of the present invention.

FIGS. 1A through 1D are side view cross sections of an exemplary clamp 30 of the present invention used for a lap weld. In this embodiment, the clamp 30 co-annularly surrounds a friction stir welding tool 20 so that clamping force can be applied to a work piece 10 when the friction stir welding tool 20 is engaged with the work piece 10. It will be appreciated that the clamp 30 of the present invention may be utilized with any manufacturing tool such as routers, cutters, and other welding devices. In FIG. 1A, the clamp 30 is shown resting against the work piece 10, but not clamping it. The work piece 10 in FIGS. 1A through 1D includes two layers of metal 11 and 12 being friction stir welded together. FIG. 1A illustrates a situation where there is a small gap 14 between the two metal layers 11 and 12. It is desired that the two metal layers 11 and 12 be firmly held together when they are friction stir welded together by the friction stir welding tool 20. The present invention provides a method and a mechanism to accomplish this. It will be appreciated that this exemplary clamp 30 co-annularly surrounds the friction stir welding tool 20, and moves with it across the work piece 10 as a weld is made. This action applies clamping force to a clamping area surrounding the friction stir welding tool 20 as it engages the work piece 10, not just to the right and left of the friction stir welding tool 20 shown in the side view cross section of FIG. 1A.

As is known in the art, a friction stir welding tool 20 includes a tip 22 that is plunged into the work piece 10 and a shoulder 24 that moves along the surface of the work piece 10 as the tip 22 is progressively moved through the work piece 10 forming a weld line.

In FIG. 1A the clamp 30 and the tool 20 are in contact with the work piece 10, but no force is being applied by either the clamp 30 or the tool 20 to the work piece 10.

The clamp 30 includes a friction reducing element 40 that reduces the friction between the clamp 30 and the work piece 10 permitting the clamp 30 to be moved across the work piece 10 with the tool 20 when the tool 20 forms a weld. In this embodiment, as described further with reference to FIGS. 2A and 3 below, the friction reducing element includes a plurality of ball bearings.

Figure 1B:
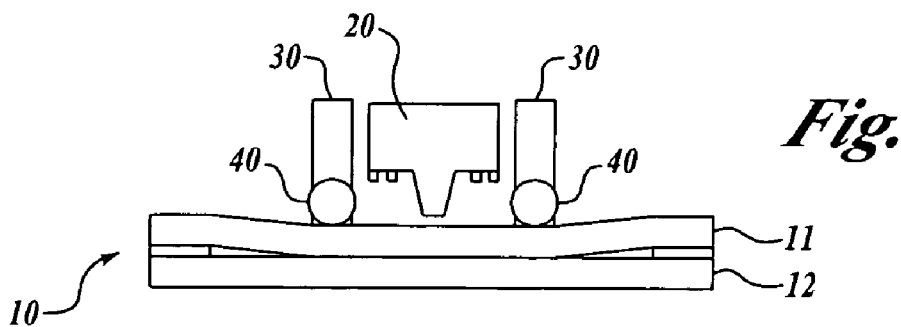
FIG. 1B is a cross-section of an exemplary clamp of the present invention clamping a work piece.

In FIG. 1B, clamping force is applied by the clamp 30 against the work piece 10 prior to the tool 20 being engaged with the surface. Clamping force is applied around the tool 20 by the clamp 30 via pressure applied through the friction reducing element 40. Clamping force applied by the clamp 30 pushes the two metal layers 11 and 12 together so that when the tool 20 is engaged there is no gap between the two metal layers 11 and 12 being welded one over the other.

Figure 1C:
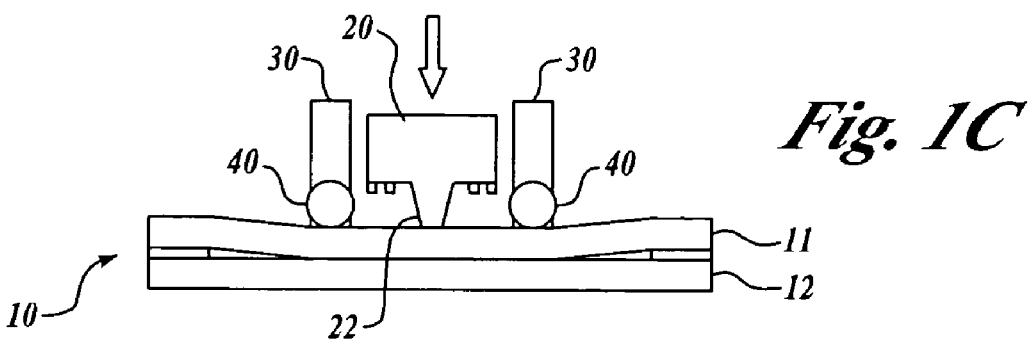
FIG. 1C is a cross-section of an exemplary clamp of the present invention clamped to a work piece while a friction stir welding tool is plunged into the work piece.

In FIG. 1C, as clamping force applied by the clamp 30 holds the two metal layers 11 and 12 of the work piece 10 together, the tip 22 of the tool 20 is plunged into the work piece 10. During the plunge, the two metal layers 11 and 12 remain together because of the clamping force applied by the clamp 30 surrounding the tool 20.

Figure 1D:
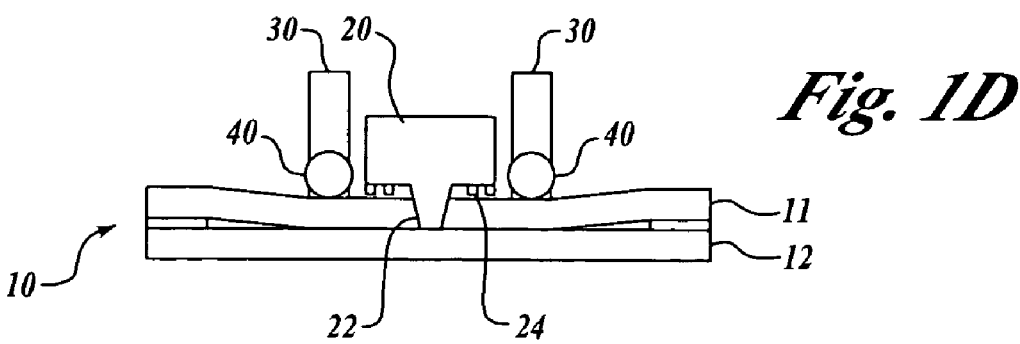
FIG. 1D is a cross-section of an exemplary clamp of the present invention clamping a work piece while a friction stir welding tool engages the work piece.

In FIG. 1D, the tool 20 is fully plunged into the work piece 10, welding together the two metal layers 11 and 12. During this process, shoulder 24 of the tool 20 contacts against the upper surface of the work piece 10. Clamping force is still applied by the clamp 30 With the tool 20 engaged with the work piece, the tool 20 and the clamp 30 suitably may be moved together laterally along the surface of the work piece 10 forming a weld (not shown) with the two metal layers 11 and 12 securely clamped together at the working area of friction stir welding.

Figure 2A:
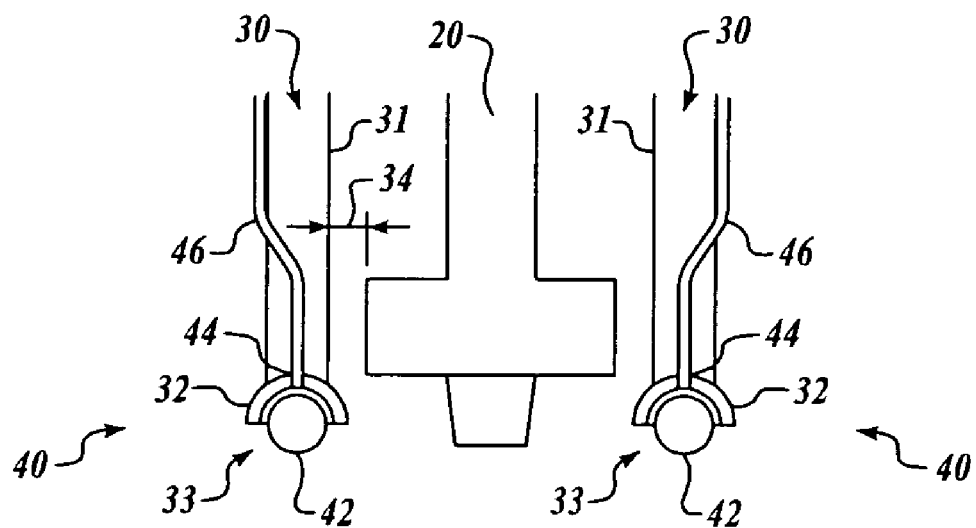
FIG. 2A is a cross-section of the clamping portion of an exemplary clamp of the present invention.

FIG. 2A is a side view cross-section of an exemplary clamp 30 that co-annularly surrounds a friction stir welding tool 20 with a sufficient clearance distance 34 to permit the tool 20 to engage the surface of the work piece (not shown) without binding against the clamp 30. The clamp 30 includes a cylindrical support 31 that co-annularly surrounds the tool 20. The support 31 may be moved relative to the surface of the work piece 10 (not shown), towards and away from the work piece 10, independent of the tool 20, permitting clamping force to be applied by the clamp 30 separately from forces used to plunge the tool 20 into the work piece 10 (not shown). In this exemplary embodiment the support 31 includes a plurality of sockets 32 around its clamping end 33. The clamping end 33 applies clamping force to the work piece 10 (not shown). The sockets 32 form a part of the friction reducing element 40. In this exemplary embodiment the friction reducing element includes hemispherical sockets 32 holding ball bearings 42 distributed around the clamping end 33 of the support 31. The configuration of the friction reducing element 40 of this exemplary clamp 30 is analogous to a plurality of ball-point pen tips arranged in a planar circle pushed against a work piece (not shown).

In this embodiment, friction between the ball bearings 42 and the sockets 32 is reduced by gas, air pressure, or a lubricating fluid or lubricant applied at an orifice 44 at the upper end of each of the plurality of sockets 32 holding the ball bearings 42. Gas (or lubricant) is fed to the orifice 44 through tubing 46 from a pressure source (not shown). By way of example, suitable lubricants may include oil or grease. It will be appreciated that applying pressure to the upper surface of the ball bearings 42 within the sockets 32 permits the ball bearings 42 to apply clamping force against a work piece (not shown) while still permitting the ball bearings 42 to roll as the clamp 30 is moved along the surface of the work piece (not shown). The clamp 30 is moved along the surface of the work piece surrounding the tool 20 as the tool 20 moves to form a weld or otherwise work the work piece (not shown).

Figure 2B:
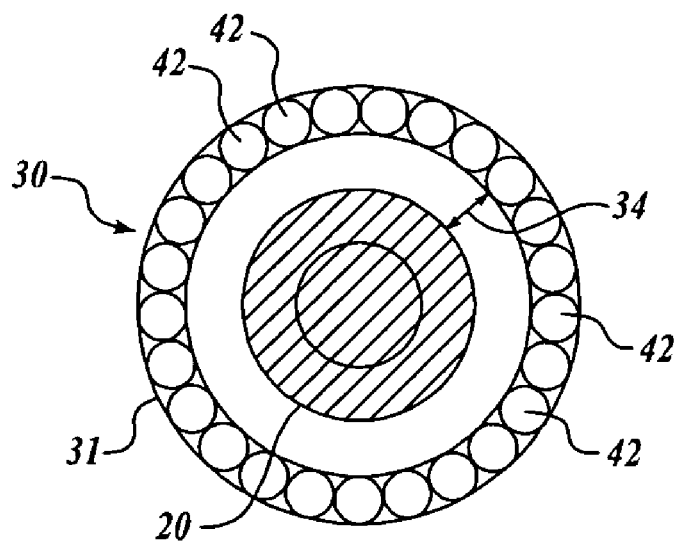
FIG. 2B is an end view of the clamping portion of an exemplary clamp of the present invention.

FIG. 2B is a clamping end (or bottom view) of the clamp 30 of FIG. 2A. The clamp 30 includes a cylindrical support 31 forming a ring surrounding the friction stir welding tool 20. A clearance distance 34 between the support 31 and the tool 20 permits the tool 20 to spin when it is engaging a work piece (not shown), and allows the tool 20 and the clamp 30 to move independently of each other when clamping and engaging the work piece (not shown). This clamping end view of the support 31 shows a plurality of the ball bearings 42 that reduce friction between the clamp 30 and the work piece (not shown) when clamping force is applied by the clamp 30 to the work piece around the tool 20. The plurality of ball bearings 42 form a ring surrounding the tool 20.

It will be appreciated that the support 31 may be broken into segments, and may be alternately shaped from a cylinder, as discussed further in reference to FIGS. 8A through 8F below. It will be also appreciated that the clamping end of a clamp of the present invention may have a non-planar surface, and may even have a variable or adjustable contour, as discussed further in reference to FIGS. 5A, 5B, 6, 7A and 7B. In this example the support 31 continuously surrounds the tool 20.

Figure 3:
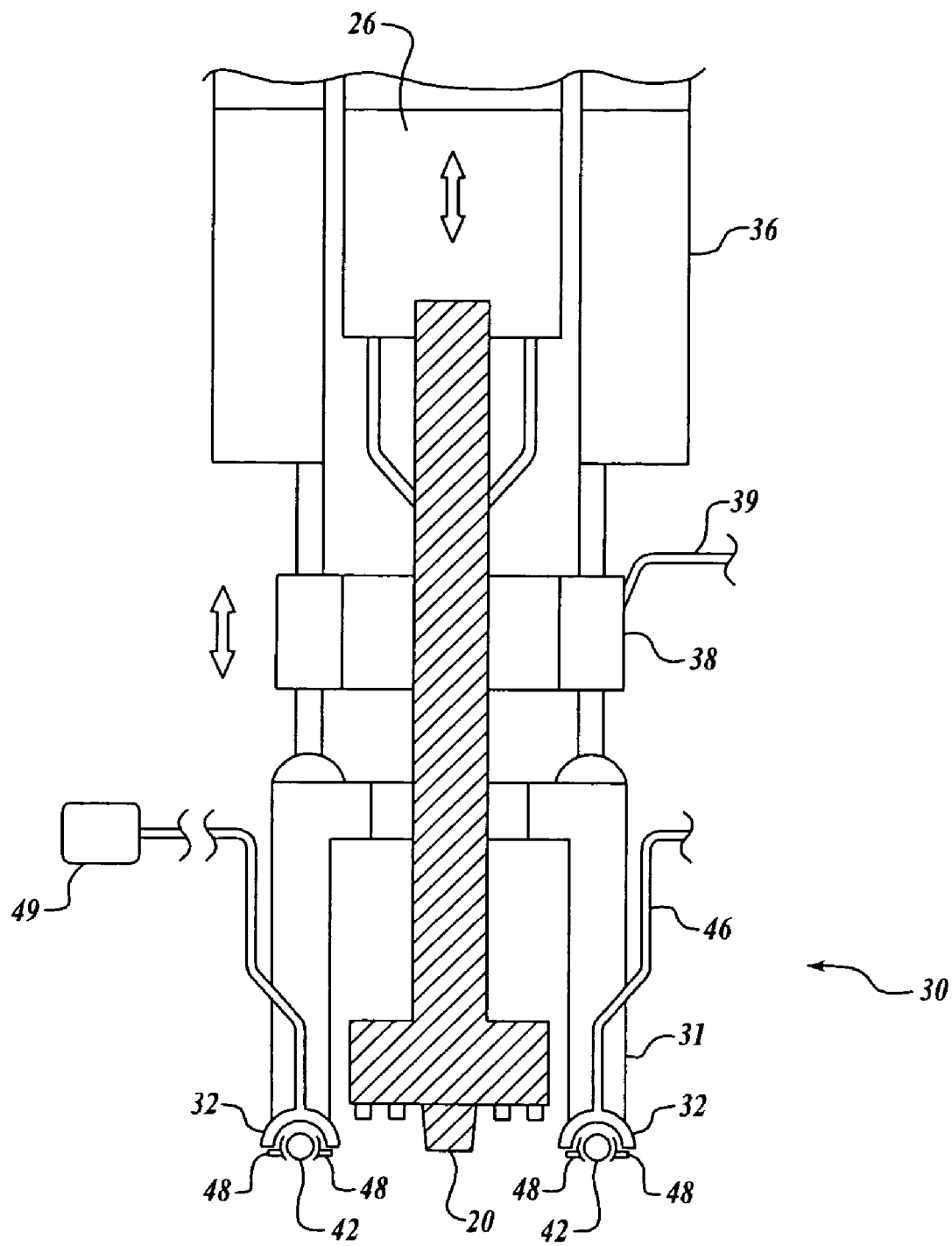
FIG. 3 is a cross-section of a clamping apparatus of the present invention.

FIG. 3 is a side view cross-section of the clamp 30 of FIGS. 2A and 2B showing the interrelationship between the friction stir welding tool 20 and the clamp 30. As in FIGS. 2A and 2B above, the clamp 30 includes a support 31 that co-annularly surrounds the friction stir welding tool 20. The support 31 includes a plurality of sockets 32 holding a plurality of ball bearings 42. In this example the ball bearings 42 are also held within a race 48 that assists holding the ball bearings 42 in the sockets 32. Friction between the ball bearings 42 and the sockets 32 is reduced by the application of air, gas, or fluid pressure through tubing 46 linked to a pressure source 49. Pressure applied at the sockets 32 pushes the ball bearings 42 away from the sockets 32 permitting the ball bearings 42 to roll along the work piece (not shown) even as clamping force is applied to the work piece by the clamp 30.

The clamp 30 may apply clamping force against a work piece (not shown) independently of the friction stir welding tool 20. The clamp support 31 is attached to a drive 38 that in this example embodiment suitably can move the clamp 30 towards and away from the work piece (not shown) applying independent clamping force to the work piece (not shown). The clamp drive 38 is controlled through control cables 39 from a processor or other controls (both not shown). The clamp drive 38 suitably may include an electric, hydraulic, or pneumatic drive, by way of example, and not limitation. The drive 38 is linked to a clamp base 36 that moves with the friction stir welding tool 20 when the tool 20 is engaged against a work piece (not shown). The clamp base 36 provides a foundation from which clamping force can be applied by the clamp drive 38 pushing the clamp 30 against the work piece (not shown). The tool 20 is held in place by a friction stir welding drive 26 that spins the tool, and enables the tool to be moved towards and away from the work piece enabling the tool 20 to plunge into the work piece 10 and weld the work piece (not shown). The friction stir welding drive 26 moves the tool 20 along a weld line (not shown) and is tracked by the clamp base 36 which moves the clamp 30 along with the tool 20 as welding occurs.

Figure 4A:
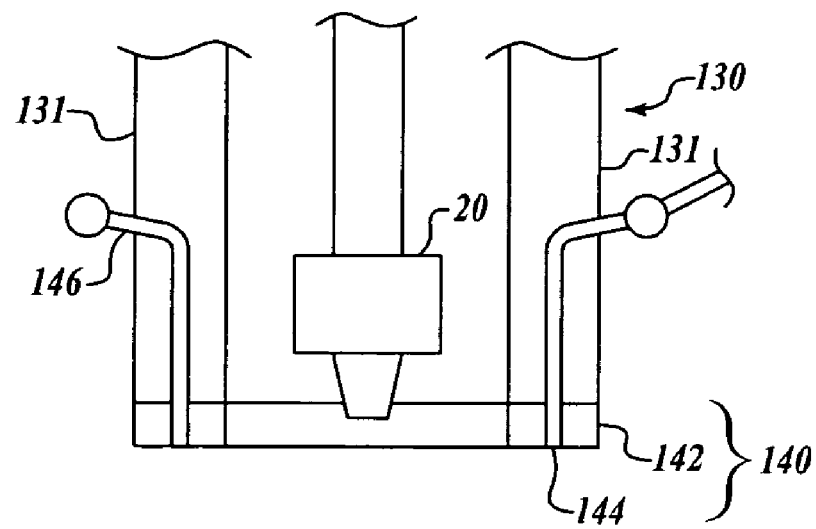
FIG. 4A is a cross-section of the clamping portion of a first exemplary alternate clamp of the present invention.

FIG. 4A shows an alternate exemplary embodiment of a clamp 130 of the present invention. In this embodiment the clamp support 131 also co-annularly surrounds the tool 20. In this exemplary embodiment, the clamp 130 includes a friction reducing element 140 like a self-lubricating material such as high-carbon cast iron (containing graphite flakes), engineered materials such as carbon graphite impregnated materials or impregnates, molydisulfide impregnates, metal polymer hybrids, or a low friction material 142 such as Teflon®. The low friction material 142 reduces friction between the clamp 130 and a work piece (not shown) when the clamp 130 applies clamping force to the work piece (not shown) prior to and during the period when the tool 20 is engaged with the work piece (not shown). In this exemplary embodiment the friction reducing element 140 also includes orifices 144 that apply pressure from a high pressure gas to the interface between the clamp 130 and a work piece (not shown). The orifice 144 is fed by tubing 146 delivering high pressure gas from a pressure source 148.

It will be appreciated that a number of components (either independently, or in combination) may be used to comprise the friction reducing element 140 reducing friction between a clamp 130 of the present invention and a work piece (not shown). In FIG. 4A the friction reducing element 140 includes a low friction material 142 and applied gas pressure via orifices 144 within the clamp support 131. In alternate embodiments of the present invention, fluid pressure via gas, air, or a fluid or lubricant may be applied alone. Low friction or self lubricating materials may be utilized separately, and in yet other embodiments, a lubricant may be utilized between the clamp 130 and the work piece.

Figure 4B:
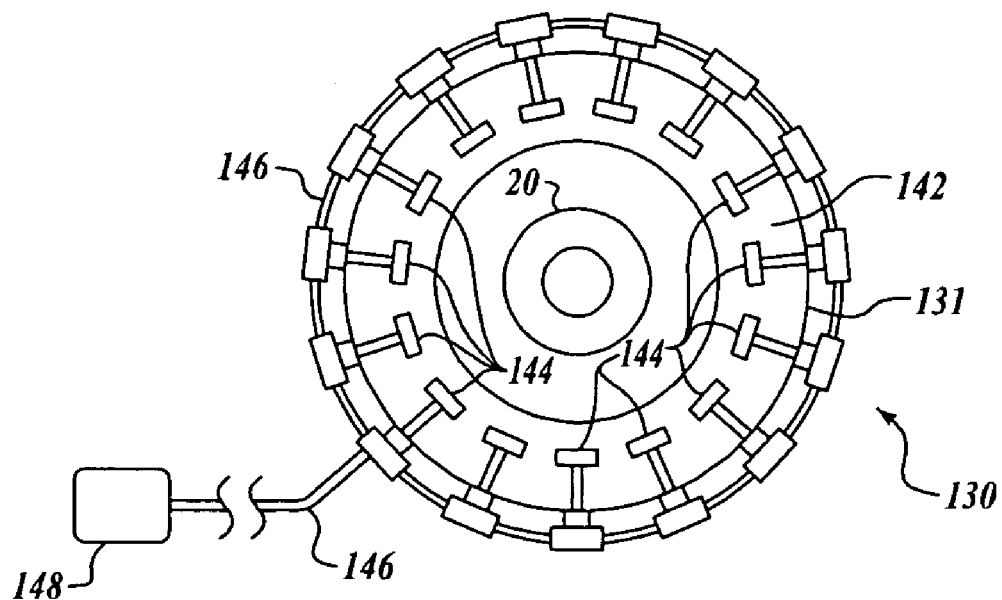
FIG. 4B is an end view of the clamping portion of a first exemplary alternate clamp of the present invention.

FIG. 4B is a clamping end view of an alternate clamp 130 of the present invention described with reference to FIG. 4A above. The clamp support 131 co-annularly surrounds the tool 20 when viewed from the clamp end. The friction reducing material 142 co-annularly surrounds the tool 20, and includes a plurality of orifices 144 spaced around the perimeter of the friction reducing element 142. The orifices 144 deliver high pressure gas to the interface between the clamp 130 and the work piece (not shown). Tubing 146 feeds high pressure gas to the orifices 144 from a high pressure source 148.

It will be appreciated that the clamping end of a clamp of the present invention may have a non-planar surface, and may even have a variable or adjustable contour.

Figure 5A:
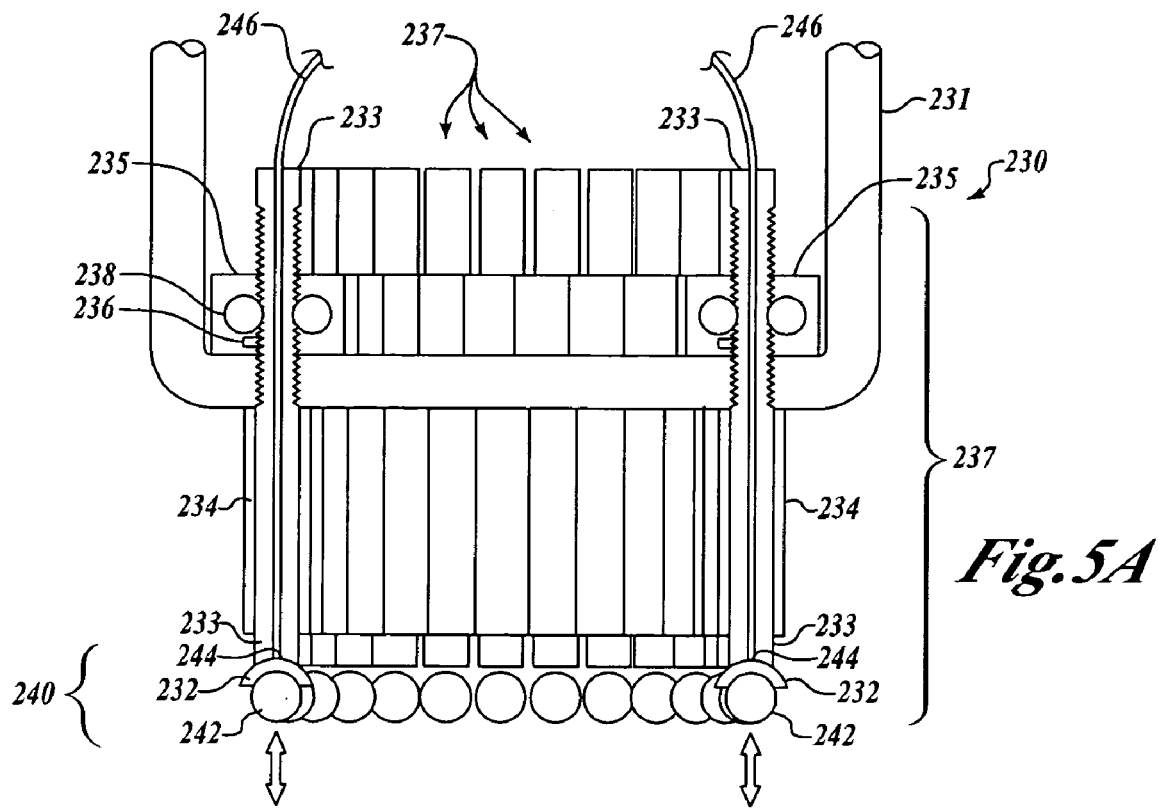
FIG. 5A is a cross-section of the clamping portion of a second alternate clamp of the present invention.

FIG. 5A shows an exemplary embodiment of a clamp 230 that suitably may adjust to varying contours in the work piece (not shown). The clamp 230 includes a co-annular support 231 from which a plurality of independently movable clamp mechanisms 237 apply clamping force to a work piece (not shown) while conforming to the contours of the work piece (not shown). The plurality of clamp mechanisms 237 are attached to the co-annular support 231 around a friction stir welding tool (not shown). Each clamp mechanism 237 applies clamping force to the work piece (not shown), while conforming to the contour of the work piece (not shown).

In this exemplary embodiment, each of the individual clamp mechanisms 237 include separately driven clamp shafts 233 movably held within sleeves 234 attached to the co-annular support 231. The shafts 233 in this embodiment slide within the sleeves 234 towards and away from the work piece (not shown) driven by independent shaft drives 235. In this embodiment, by way of example but not limitation, the shaft drives 235 include independent electric drives 238 combined with feedback sensors 236 permitting the shaft drives 235 to apply a pre-determined amount of clamping force to a work piece (not shown). Each of the plurality of shafts 233 includes a friction reducing element 240 including ball bearings 242 and sockets 232 with friction between the ball bearings 242 and the sockets 232 reduced by air pressure provided through an orifice 244 in the socket 232. Each shaft 233 has a socket 232 and a ball bearing 242. Each shaft 233 also includes an orifice 244 applying gas, air, or fluid pressure in the socket 232, thereby reducing friction permitting the ball bearings 242 to roll across the work piece (not shown) when clamping force is applied to the work piece. Gas, air, or fluid pressure is applied through the orifice 244 from a pressure source (not shown) via tubing 246 in each shaft 233.

To extend the analogy described in reference to FIG. 2A above, the exemplary clamp 230 of FIG. 5A is similar in form to a plurality of ball-point pens arranged in a cylinder with their tips all at one end. Each ball-point pen is individually or in subgroups moveable relative to its neighbors, and are parallel to the wall of the cylinder. Thus, when the cylinder is held generally normal to a surface with the pen tips against the surface, each tip can engage the surface even as the contour of the surface changes, or as the weld path or weldline changes direction or curves laterally. It will be appreciated that for fixed radius surfaces, or for other fixed contour surfaces the analogous "pens" may be fixed relative to their neighbors with the result that the tips match the fixed contour as they are drawn across the surface. It will also be appreciated that one or more of the analogous pen shafts may also operate together, or in segments suitably matching the contour of the underlying surface.

Figure 5B:
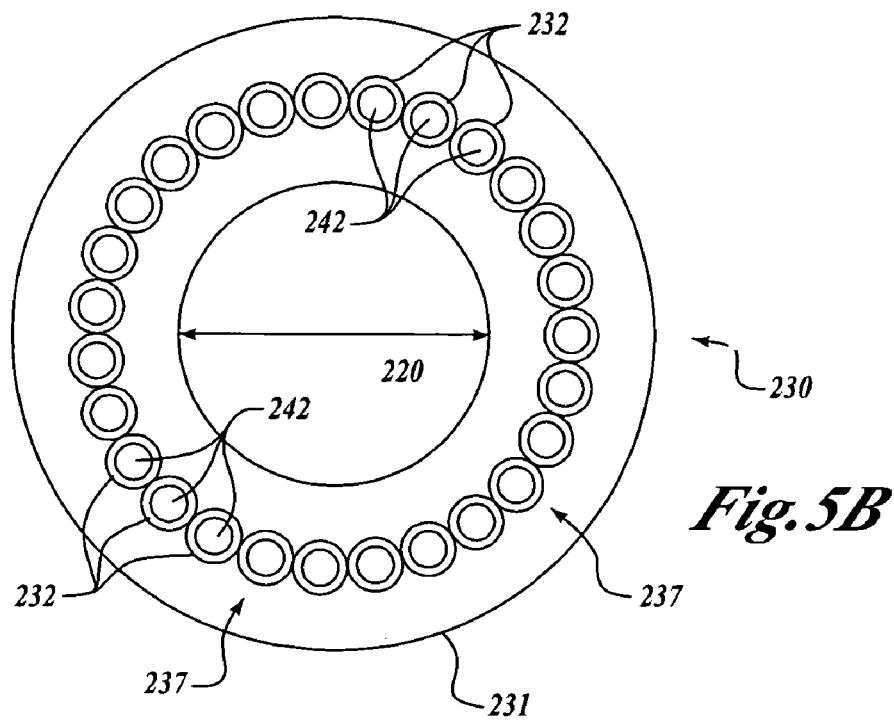
FIG. 5B is an end view of the clamping portion of a second alternate clamp of the present invention.

FIG. 5B is a clamping end view of the example clamp 230 of FIG. 5A. When viewed from the clamping end, the co-annular support 231 forms a base surrounding a central circular opening 220, thus permitting insertion of a manufacturing tool. In this example embodiment the co-annular support 231 forms a central opening 220 for the manufacturing tool (not shown). Surrounding the opening 220 are a plurality of the individual clamp mechanisms 237. When viewed from the clamping end the clamp mechanisms 237 are visible as a plurality of sockets 232 holding a plurality of ball bearings 242 in a ring surrounding the opening 220 of the co-annular support 231.

Figure 6:
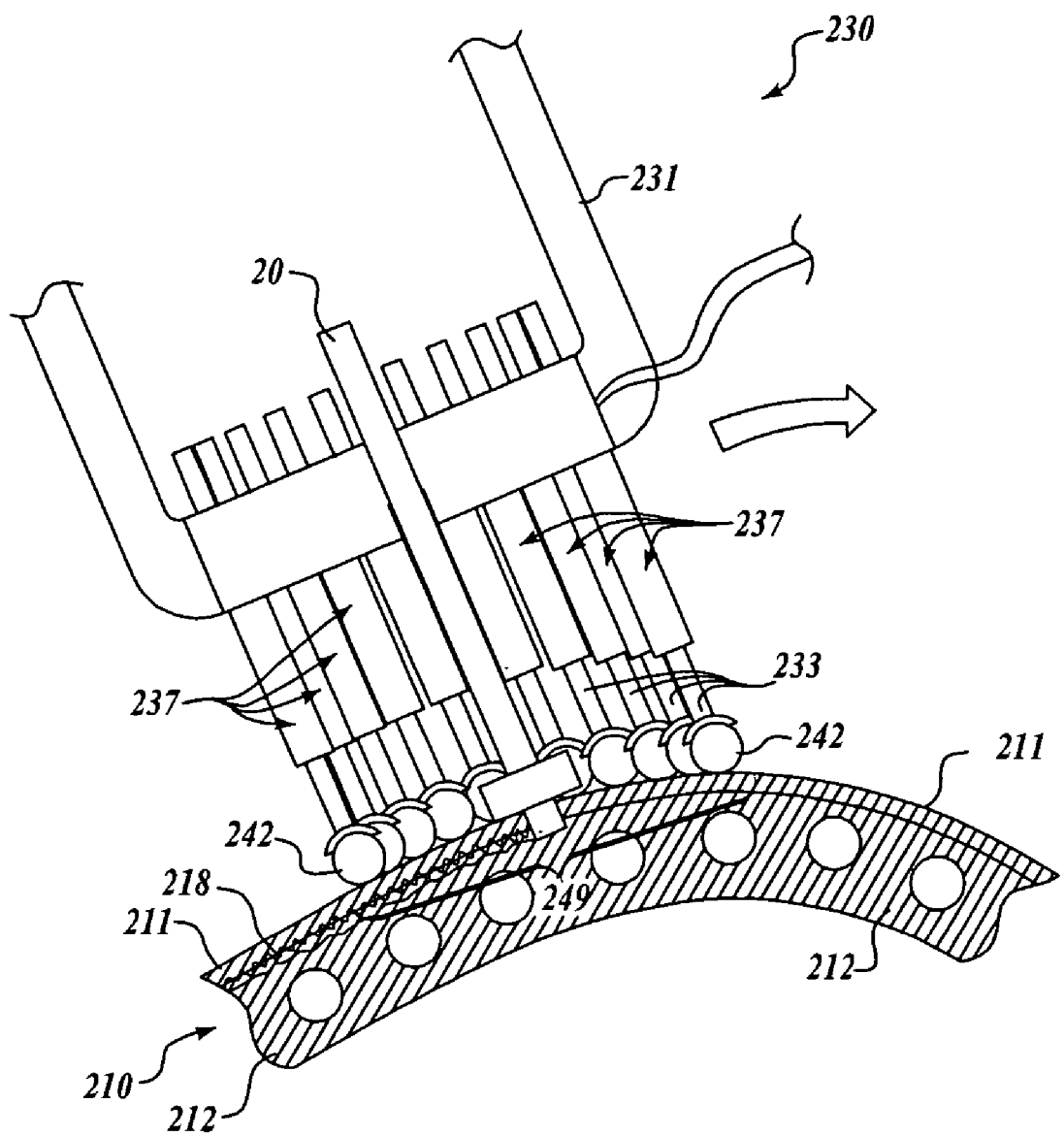
FIG. 6 is a side view of a second alternate clamp of the present invention applying clamping force to a work piece.

FIG. 6 is a side view cross-section of the exemplary clamp 230 (as described with reference to FIGS. 5A and 5B above) in place on a curved work piece 210. The clamp 230 surrounds a friction stir welding tool 20 engaging the work piece 210. In FIG. 6 the work piece 210 includes a skin 211 being fastened to an underlying rib 212. The rib 212 has a curved outer surface to which the skin 211 is being attached through a friction stir weld 218. In this example the welding process is proceeding from left to right and the skin 211 has been welded to the underlying rib 212 to the left of the tool 20 while the skin 211 to the right of the tool 20 remains to be welded. The clamp 230 (as shown in FIGS. 5A and 5B) includes a plurality of individual clamp mechanisms 237 arranged around the tool 20. Each clamp mechanism 237 includes a shaft 233 pressing a ball bearing 242 against the work piece 210. Each of the plurality of shafts 233 surrounding the tool 20 is independently positionable so a suitable conformable clamping force may be applied to hold the skin 211 against the rib 212 while welding proceeds. The clamping area 249 completely surrounds the tool 20 as welding proceeds over the curved surface of the rib 212 and skin 211. The shafts 233 move relative to the co-annular support 231 contemporaneously with movement of the tool 20 permitting the ball bearings 242 to conformably roll across the work piece 210 and apply clamping force around the tool 20. In this example the clamping area 249 is a curved surface. It will be appreciated that with the clamp mechanisms 237 independently positionable, the clamp 230 can conform to a wide variety of contours of the work piece 210 as friction stir welding or other manufacturing occurs.

Figure 7A:
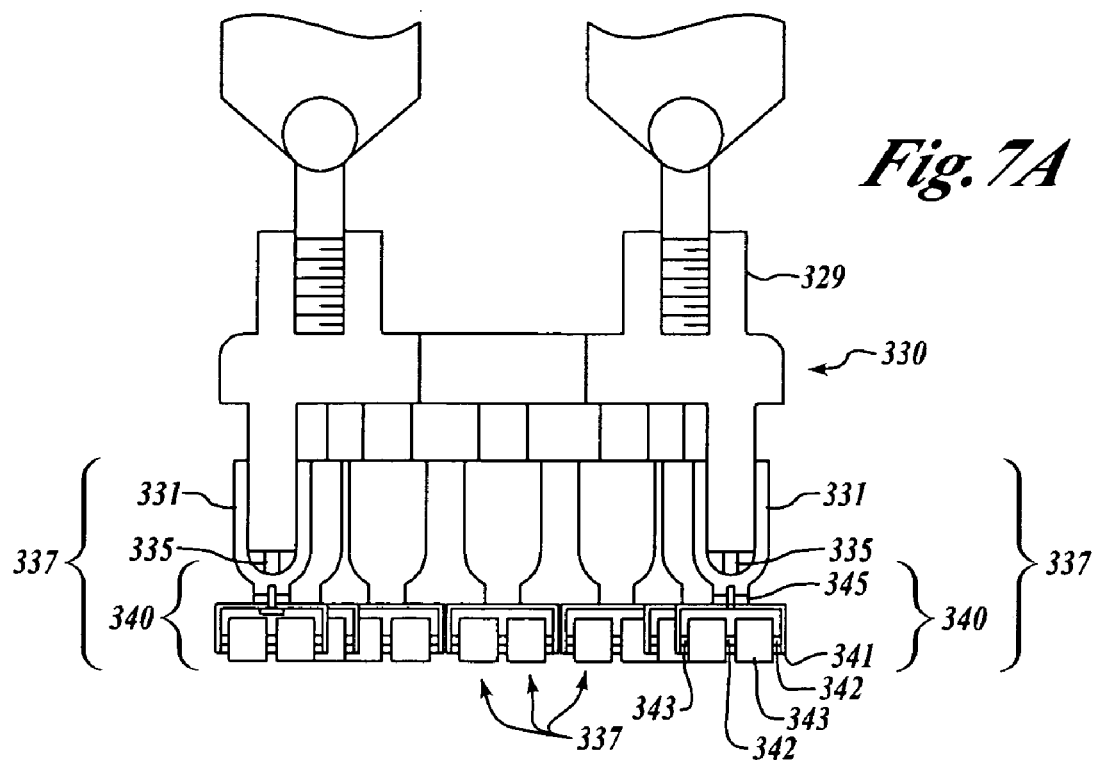
FIG. 7A is a side view cross-section of a third alternate clamp of the present invention.

It will be appreciated that a wide variety of friction reducing elements may be utilized with a clamp of the present invention to reduce friction between the clamp and the work piece even as the clamp suitably conforms to contours in the work piece. In FIG. 7A an exemplary clamp 330 utilizes rollers 343 as part of the friction reducing element 340 to reduce friction between the clamp 330 and the work piece (not shown). The clamp 330 by way of example and not limitation, includes a plurality of independently positionable clamp mechanisms 337. The mechanisms 337 include a plurality of shafts 331 that apply clamping force to a work piece (not shown) through shaft drives 335. Attached to each of the plurality of shafts 331 is a friction reducing castors 340 including rollers 343. The friction reducing castors 340 by way of example, and not limitation, in this embodiment include a pivot 345 linked to the shaft 331. A truck 341 holding the rollers 343 is attached to the pivot 345. The truck 341 can thus pivot in the plane of the work piece with respect to the shaft 331 where the clamp 330 follows a curving weldline (not shown). The truck 341 carries an axle 342 holding two rollers 343. The two rollers 343 are situated on the axle 342 to either side of the pivot 345 above them. The truck 341 with the two rollers 343 on the pivot 345 in essence acts as a pivoting castor with the two rollers 343 reducing sheer on the work piece (not shown) and hence friction by counter-rotating as the truck 341 pivots. The pivoting truck 341 permits the clamp 330 to change directions or follow curves on the work piece (not shown) while still applying clamping force to the work piece. Thus in this embodiment the clamp 330 includes a plurality of trucks 341 with rollers 343 pivoting on a plurality of shafts 331. Each shaft 331 applies clamping force to the work piece through a shaft drive 335 allowing the clamp 330 to conform to a complex surface of the work piece (not shown) as the clamp 330 is moved along the work piece. A manufacturing tool (not shown) such as a friction stir welding tool suitably may be positioned within the circular clamp area formed by a ring of trucks 341 with their respective rollers 343 applying clamping force to the work piece (not shown).

Figure 7B:
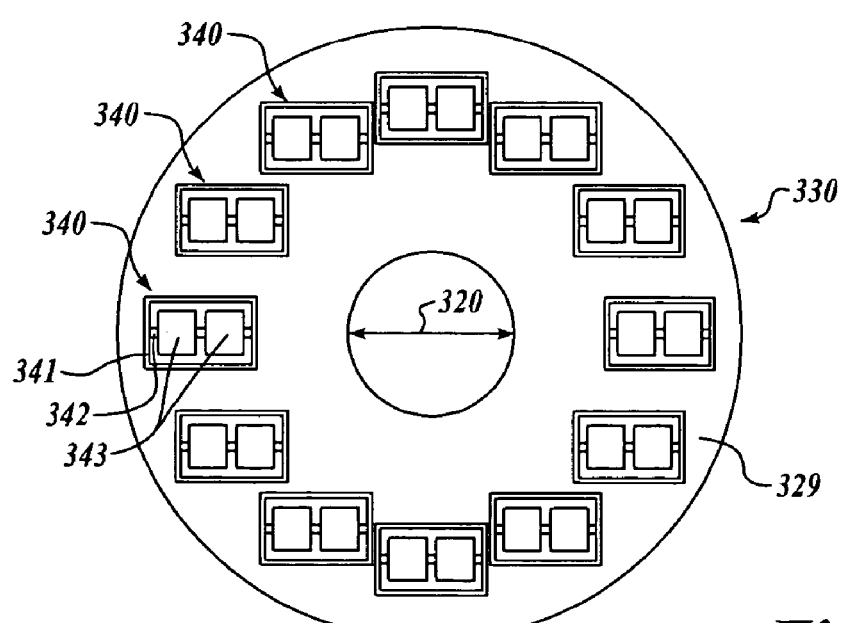
FIG. 7B is an end view of a third alternate clamp of the present invention.

FIG. 7B is a clamping end view of the clamp 330 described in FIG. 7A above. The clamp 330 includes a clamp support 329 that co-annularly surrounds an opening 320 for a manufacturing tool (not shown). When viewed from the clamp end, the visible portion of the clamp 330 is the plurality of castors 340 arranged in a ring surrounding the opening 320. Each castor 340 includes a truck 341, an axle 342 and two rollers 343. It will be appreciated that the castors 340 may pivot as the clamp 330 is moved across the work piece.

Turning to FIGS. 8A through 8F, it will be appreciated that a clamp of the present invention may partially or substantially surround a manufacturing tool working on a work piece (not shown) in a wide variety of configurations.

Figure 8A:
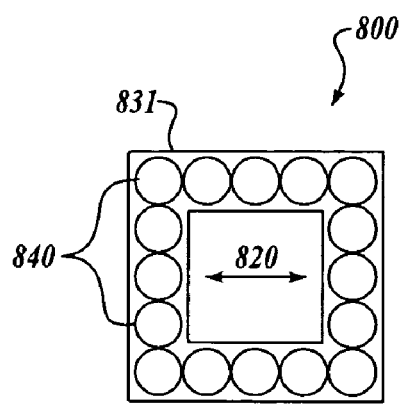
FIG. 8A is an end view of a square shaped embodiment of a clamp of the present invention.

In FIG. 8A, a clamp 800 is shown as viewed from the clamping end. In this example embodiment the clamp support 831 is in the form of a square surrounding a square central opening 820 where a manufacturing tool (not shown) may engage a work piece (not shown). A plurality of friction reducing elements 840 are positioned around the perimeter of the clamp support 831.

Figure 8B:
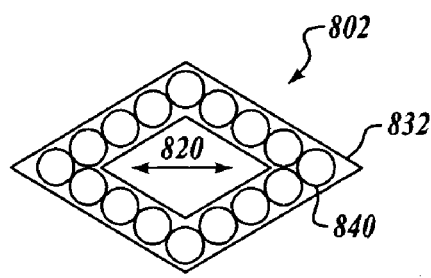
FIG. 8B is an end view of a diamond shaped embodiment of a clamp of the present invention.

In FIG. 8B, another exemplary clamp 802 includes a clamp support 832 in the form of a diamond surrounding a diamond shaped central opening 820. Again, the clamp support 832 includes a plurality of friction reducing elements 840 positioned around the perimeter of the clamp support 832.

Figure 8C:
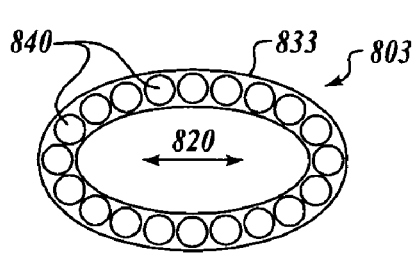
FIG. 8C is an end view of an oval shaped embodiment of a clamp of the present invention.

In FIG. 8C, a further exemplary clamp 803 of the present invention is viewed from the clamp end and has an oval configuration. The clamp support 833 forms an oval surrounding an oval central opening 820. A plurality of friction reducing elements 840 are arranged around the perimeter of the clamp support 833.

Figure 8D:
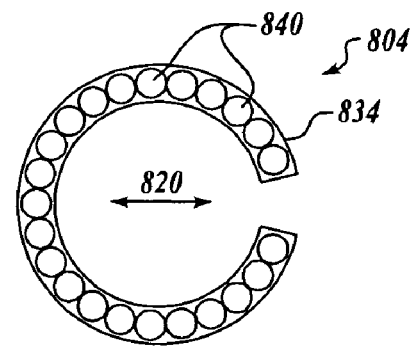
FIG. 8D is an end view of a "C" shaped embodiment of a clamp of the present invention.

It will be appreciated that clamping force may be applied from a clamp support that may only partially or substantially surround the manufacturing tool engaging the work piece. In FIG. 8D, an exemplary clamp 804 of the present invention when viewed from the clamp end is in the shape of a "C" substantially surrounding, but not completely enclosing a circular central opening 820 for the manufacturing tool (not shown). In this example embodiment as viewed from the clamp end, the clamp support 834 is "C" shaped. Arranged around the "C" are a plurality of friction reducing elements 840.

Figure 8E:
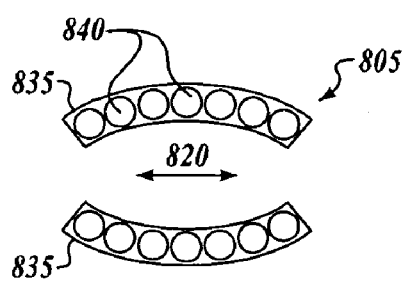
FIG. 8E is an end view of a broken oval shaped embodiment of a clamp of the present invention.

The clamp of the present invention may also be segmented. In FIG. 8E, an exemplary clamp 805 of the present invention includes two arc shaped clamp supports 835 positioned with their concave sides facing towards each other surrounding an oval shaped opening 820, that is not closed on its ends. Around the perimeter of the arc shaped clamp supports 835 are a plurality of friction reducing elements 840.

Figure 8F:
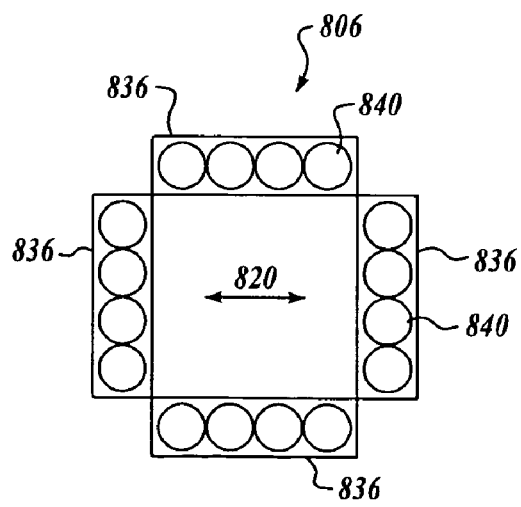
FIG. 8F is an end view of a broken square shaped embodiment of a clamp of the present invention.

In FIG. 8F, an alternate segmented clamp 806 of the present invention is shown. By way of example and not limitation, the clamp 806 includes four straight clamp support segments arranged 836 in a square around a square central opening 820 with open corners. Each of the four clamp support segments 836 includes a plurality of friction reducing elements 840. It will be appreciated that a polygon of clamp segments 836 can have any number of sides surrounding the central opening 820.

In addition to having a variety of clamp support configurations in the plane of the work piece, a clamp of the present invention may also be configured either adjustably, or fixedly to conform to a curved or contoured work piece.

Figure 9A:
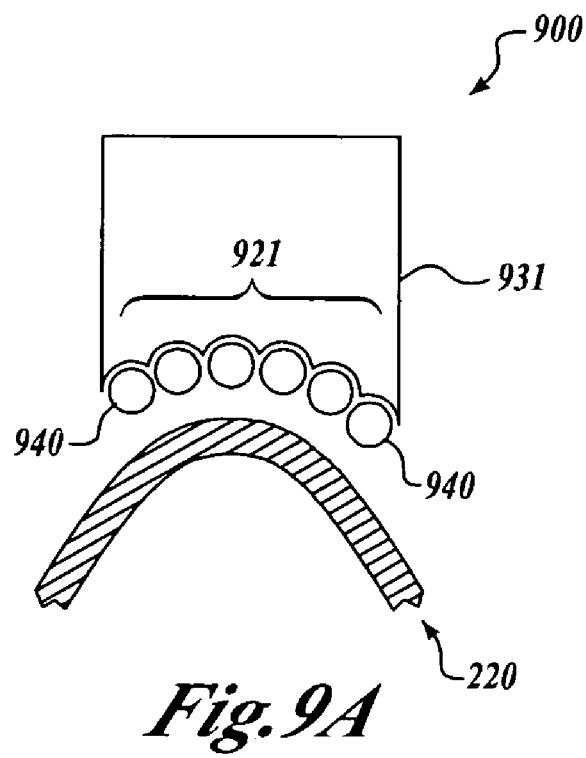
FIG. 9A is a side view of a curved contour embodiment of a clamp of the present invention.

In FIG. 9A, by way of example but not limitation, a clamp 900 of the present invention includes a clamp support 931 holding a plurality of friction reducing elements 940. The clamp support 931 includes a fixed concave contour 921 around its perimeter conforming to a curved work piece 220. In this example embodiment the clamp 900 may surround a tool (not shown) applying movable clamping force that may be moved longitudinally along a rounded ridge surface as work occurs in the center of the clamp 900.

Figure 9B:
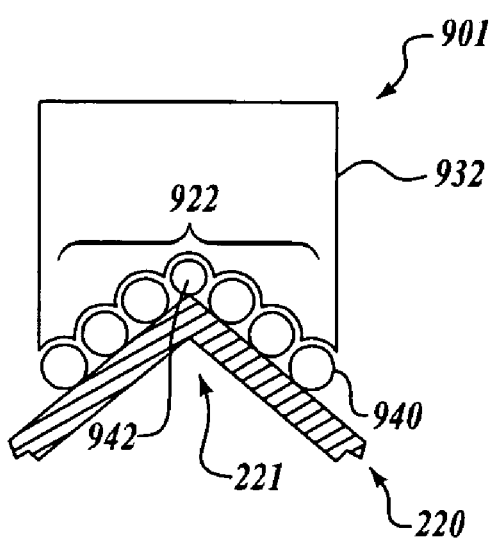
FIG. 9B is a side view of an angled contour embodiment of a clamp of the present invention.

In FIG. 9B an exemplary clamp 901 of the present invention includes a clamp support 932 with a fixed angle contour 922 configured to correspond to a corner in a work piece 220. In this example embodiment the clamp 901 can apply moveable clamping force along an angular edge of a work piece 220 as work is performed on the work piece. It will be appreciated that the clamp 901 matches the work piece 220 if it is moved longitudinally along the angled edge, but not if the clamp 901 is moved laterally across the edge. As with prior embodiments of the present invention, the clamp support 932 includes a plurality of friction reducing elements 940. Near the vertex 221 of the work piece 220, one of the friction reducing elements 942 is of a smaller size than the other friction reducing elements 940. It will be appreciated that a variety of sizes and configurations of friction reducing elements may be incorporated into a clamp of the present invention.

Figure 10:
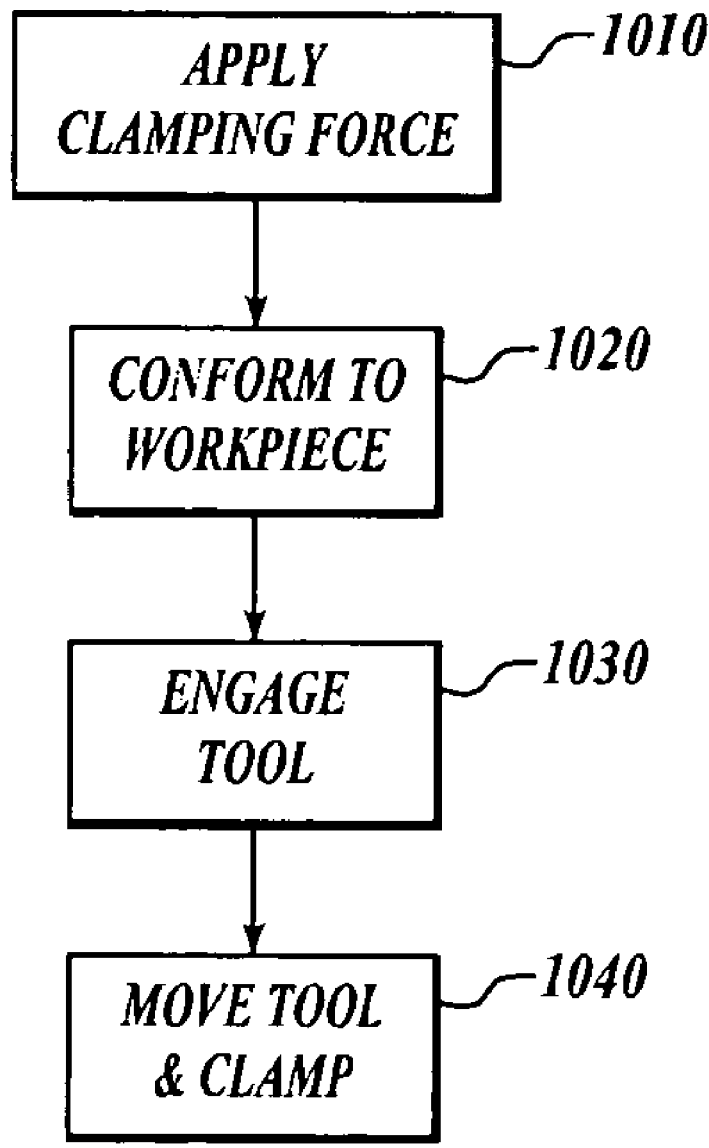
FIG. 10 is a flow chart of an exemplary method of the present invention.

In FIG. 10, a method for clamping during a manufacturing operation on a work piece is illustrated. At a block 1010, clamping force is applied via a clamp at least partially surrounding a work area on the work piece. At a block 1020, suitably depending upon the contour of the underlying work piece, the clamping force is conformed to the surface contour of the work piece. At a block 1030, the manufacturing tool is engaged with the work piece. After the tool is engaged with the work piece in the manufacturing operation the clamp and tool are moved together along or across the work piece at a block 1040, thus completing the manufacturing operation.

While the preferred embodiment of the present invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A clamp for securing a work piece during a manufacturing operation, comprising:
    a support arranged to at least partially surround a circumference defining a work area on the work piece, the support having a first end movable relative to a surface of the work piece; and
    at least one rotatable friction reducing element disposed between the first end and the work piece, the at least one rotatable friction reducing element configured to at least partially surround the work area and apply a clamping pressure to the surface when the clamp is engaged with the work piece and moved across the work piece,
    wherein the at least one rotatable friction reducing element is at least partially supported at the first end by one of a fluid pressure or a gas pressure that facilitates a rotation of the friction reducing element on the surface of the work piece.

2. The clamp of claim 1, wherein the support is adapted to substantially surround the circumference.

3. The clamp of claim 1, further comprising a friction stir welding tool disposed within the work area.

4. The clamp of claim 1, wherein the circumference surrounds and is larger than a diameter of a friction stir welding tool.

5. The clamp of claim 1, wherein the support includes a cylinder.

6. The clamp of claim 1, wherein the friction reducing element includes a lubricant.

7. The clamp of claim 1, wherein the friction reducing element includes a low friction material.

8. The clamp of claim 7, wherein the low friction material includes polytetrafluoroethylene.

9. The clamp of claim 1, wherein the friction reducing element includes a self-lubricating material.

10. The clamp of claim 9, wherein the self lubricating material includes one of high-carbon cast iron, carbon graphite impregnates, molydisulfide impregnates, and metal polymer hybrids.

11. The clamp of claim 1, wherein the friction reducing element includes a plurality of ball bearings.

12. The clamp of claim 11, wherein the plurality of ball bearings are at least partially held against the surface by fluid pressure.

13. The clamp of claim 11, wherein the plurality of ball bearings are at least partially held against the surface by gas pressure.

14. The clamp of claim 1, wherein the friction reducing element includes a plurality of roller bearings.

15. The clamp of claim 14, wherein the roller bearings are held in pivoting holders.

16. The clamp of claim 1 wherein the friction reducing element includes a race of bearings.

17. The clamp of claim 1, wherein the friction reducing element includes a plurality of pivoting and rolling castors.

18. The clamp of claim 1, wherein the friction reducing element includes a pressurized gas adapted to apply pressure to the surface.

19. The clamp of claim 1, wherein the friction reducing element includes a pressurized fluid arranged to apply pressure to the surface.

20. The clamp of claim 1, wherein the support includes a mechanism to move the first end towards and away from the surface.

21. The clamp of claim 20, wherein the mechanism includes at least one of a spring, a cam, a threaded adjusting link, a pneumatic actuator, a solenoid, an electromagnetic actuator, and a hydraulic actuator.

22. The clamp of claim 20, wherein the mechanism includes a feedback system to maintain a specified pressure against the surface.

* * * * *